Aug. 7, 1934.  J. KUBLER ET AL  1,969,668
RECTIFIER
Filed Sept. 10, 1928   2 Sheets-Sheet 1

Inventors:
Johannes Kubler
Julius Jonas
By
    Attorney.

Inventors:
Johannes Kubler
Julius Jonas
By Alfred H. Dyson
Attorney.

Patented Aug. 7, 1934

1,969,668

UNITED STATES PATENT OFFICE 1,969,668

RECTIFIER

Johannes Kübler and Julius Jonas, Baden, Switzerland, assignors to Aktiengesellschaft Brown Boveri & Cie., Baden, Switzerland, a joint-stock company of Switzerland Application September 10, 1928, Serial No. 305,111
In Germany September 10, 1927

8 Claims. (Cl. 175—363)

This invention relates to circuits for the equal distribution of electric current from separate secondary windings of a common transformer to a plurality of anodes operating in parallel in a mercury arc rectifier.

Arrangements for supplying a plurality of anodes operating in parallel in one or in a plurality of rectifiers are well known in the art, but heretofore, in such arrangements, each anode was supplied by a separate secondary winding of a common transformer. To produce the desired result all the secondary windings were distributed over the entire primary winding in a side-by-side relation, in the direction of the axis of the transformer leg in such manner that the primary ampere turns were fully compensated at each moment. Because the current in each phase of the primary winding changes direction once during each cycle of the alternating current, each primary winding had to act oppositely to opposing groups of secondary windings, one of these groups carrying the anode current in one direction and the other group carrying the current in the opposite direction.

The distribution of current to the anodes of a rectifier is primarily determined by the inductive properties of the windings of the transformer, that is, by the inductive voltage drop in the anode circuit and by the inductive coupling of the secondary windings with the primary windings. If the inductive coupling is disregarded for the moment, it will be readily understood that similar design and position of the secondary windings will cause a similar voltage drop and, therefore, a similar or equal distribution of current to the circuits connected therewith.

However, if a common primary winding, distributed over the whole length of the leg, is opposed to the entirety of the secondary windings arranged thereover, then there will be not only direct dependency of current between the primary and secondary windings, but also an indirect dependency among the several secondary windings. The current in the primary windings will induce in the secondary windings currents of such magnitude that the ampere turns of the primary and secondary windings of the transformer will balance each other.

The above may be mathematically illustrated as follows, in which $w'$ indicates the number of windings in the primary, $w''_1\ w''_2$ etc., indicates the number of windings in the secondary, $a'\ a''$ etc., indicates the primary current carrying coils and $b'\ b''$ etc., indicates the secondary current carrying coils then the relation is as follows;

$$pw' = b'w''_1 = b''w''_2 = b'''w''_3$$

and if $$w''_1 = w''_2 = w''_3$$

then according to the above relation $$a' = a'' = a''$$

Such inductive relation of the primary to the secondary winding is very favorable to uniform current distribution on the anodes, but in transformers of very large output, as is well known by persons skilled in the art, in the case of short circuit of a single coil of the secondary, such powerful magnetic forces are exerted on the primary in the direction of the axis of the transformer leg that the usual mechanical structure of the transformer is insufficient to prevent destruction thereof.

It is therefore among the objects of the invention to provide an arrangement of the windings of a transformer for a rectifier which will prevent the production of forces destructive to the transformer upon occurrence of a short circuit therein.

A further object of the invention is to arrange the windings of a transformer in such manner that the secondary winding will compensate the primary winding at every moment.

Another object of the invention is to arrange the primary windings of a rectifier supplying transformer in a number of parts, arranged in parallel, equal to the number of secondary winding parts.

A further object of the invention is to provide an arrangement for the windings of a rectifier supplying transformer for producing equal distribution of current to the circuits supplied therefrom which consists in dividing the primary winding into a number of equal parts arranged in side-by-side relation on the core and an equal number of secondary windings opposite to the primary windings whereby equal voltage drops are obtained inductively in the secondary rather than through the coupling of the windings.

Other objects and advantages will appear in the following description and the drawings, in which for the purpose of illustration only, several embodiments of the invention are shown, and wherein Fig. 1 is a diagrammatic showing of the invention in which choke coils are utilized to correct the presence of stray flux in the transformer.

Referring more particularly to the drawings by characters of reference, a rectifier housing of the usual construction is indicated at 5. The rectifier is provided with anodes $a_1$, $a_2$, $a_3$, $a_4$, $a_5$, $a_6$, $a_7$, $a_8$, of any known construction. The rectifier is supplied from an alternating current distribution system 6 by means of a transformer having a plurality of primary windings $p_1$, $p_2$, $p_3$, $p_4$, of equal size arranged in side-by-side parallel connected relation and an equal number of secondary windings each divided into two sections $s'_1$, $s''_1$; $s'_2$, $s''_2$; $s'_3$, $s''_3$; $s'_4$, $s''_4$, respectively, which are divided into two groups of sections $s'_1$, $s'_2$, $s'_3$, $s'_4$, and $s''_1$, $s''_2$, $s''_3$, $s''_4$, which are arranged in such manner over the leg of the transformer core that the one group compensates the primary windings in each direction of the A. C. cycle; that is, the sections comprising group $s'_1$, $s'_2$, $s'_3$, $s'_4$, carry current of the same secondary phase to alternate anodes beginning at anode $a$, and the sections comprising group $s''_1$, $s''_2$, $s''_3$, $s''_4$ carry the same secondary phase, 180° out of phase with that first mentioned, to alternate anodes beginning at anode $a_2$.

The rectifier supplies a D. C. distribution system 7 having a load 8. This method of connection provides for equal current supply to the anodes from the secondary of the transformer by providing an approximately equal voltage drop in each of the secondary circuits. With this arrangement, occurrence of a short circuit in the rectifier will affect only one secondary and one primary winding thereby preventing the creation of forces tending to press the coils in the direction of the axis of the transformer core leg. In this arrangement the equal voltage drop is a consequence of the particular arrangement of the secondary coils. If, in spite of this arrangement, small quantities of stray flux are present, additional choke coils 9 and 10 may be placed in the anode circuits. It will be apparent to those skilled in the art that the disclosed arrangement of coils within a transformer in the case of a short circuit therein affects only one of the coils in the secondary and primary windings, instead of all the coils in each winding, thereby preventing the production of forces along the axis of the core in any direction.

Figure 1:
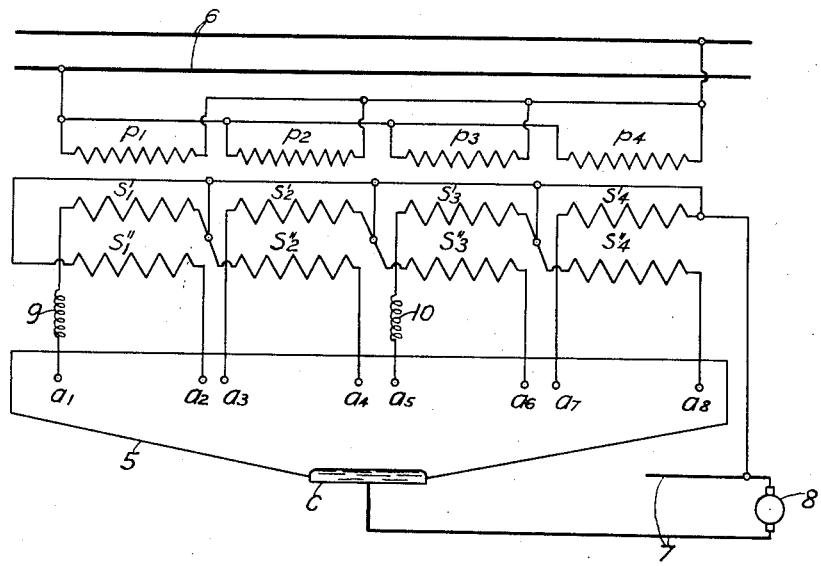
Figure 2:
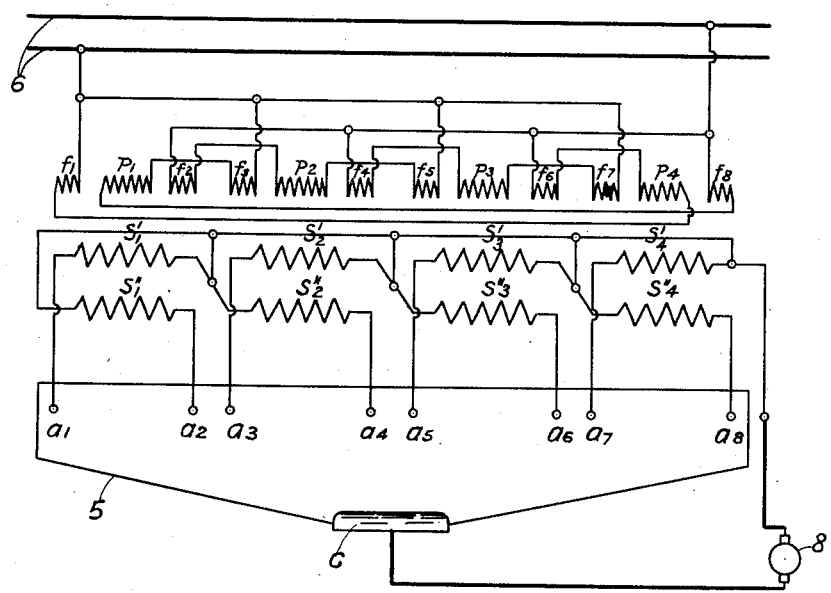
Fig. 2 is a diagrammatic showing of the invention in which the primary winding of the transformer has a number of coils coordinated with the secondary winding and a number of coils merely inductively coupled thereto.
Figure 3:
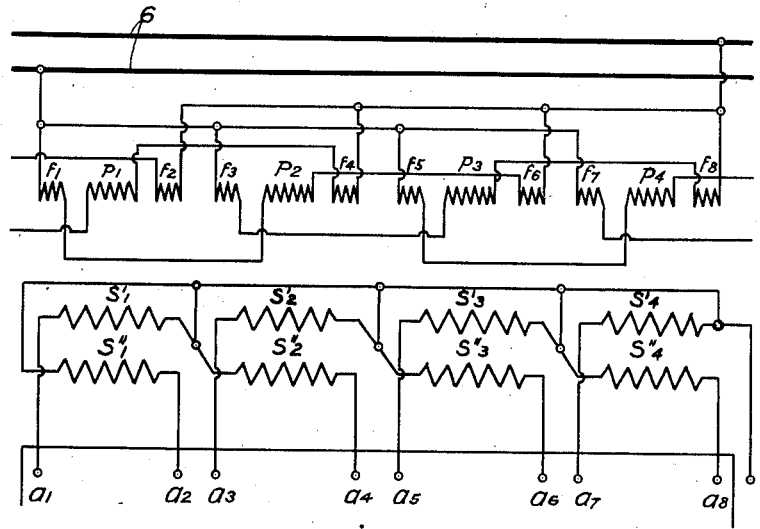
Fig. 3 is a diagrammatic showing of the invention similar to that shown in Fig. 2, excepting that windings of the primary are differently arranged and the rectifier is only partially shown.

An even more preferable embodiment of the invention is shown in Figs. 2 and 3 in which the sections of each of the secondary windings are coordinated with a separate winding of the primary, and the primary is supplied, in addition to the coordinated coils, with a number of coils $f_1$, $f_2$, $f_3$, $f_4$, $f_5$, $f_6$, $f_7$, $f_8$, which are not coordinated with the secondary windings but are merely inductively coupled thereto.

The coils $f_1$, $f_2$, $f_3$, $f_4$, $f_5$, $f_6$, $f_7$, $f_8$, are a portion of the total primary winding and are arranged and connected in the same way as the coils $p_1$, $p_2$, $p_3$, $p_4$.

Equal voltage drop in the several circuits is secured and is inductively re-enforced by the uncoordinated coils thereby preventing axial pressure thereon. The difference of the ampere turns of the coils of the two windings directly opposite each other is very small and corresponds to those ampere turns of the primary winding which are uncoordinated.

The axial pressure forces are entirely negligible, especially in the arrangement shown in Fig. 3, because of the separation of the windings.

If it is desired to avoid bringing windings having large potential differences into proximity, for the purpose of facilitating making of the parallel connections and to prevent undesirable intermingling of the winding ends, the adjacent coils may be oppositely wound so that only the ends of equal voltage come together.

It will be understood by those skilled in the art that the transformer arrangement herein described may be applied to either a single phase or a multi-phase device; that in a multiphase device the primary windings may be connected either in the known star or delta manner; and, as will be obvious to those skilled in the art, the secondary windings may be connected with and supply anodes arranged in the same rectifier casing as shown, or the secondary windings may be connected with anodes distributed in two or more casings. Thus anodes $a_1$, $a_2$, $a_5$, $a_6$, may be arranged within one casing and anodes $a_3$, $a_4$, $a_7$, $a_8$, arranged in a second casing, or $a_1$, $a_4$, $a_5$, $a_8$, may be arranged within one casing and $a_2$, $a_3$, $a_6$, $a_7$, arranged within a second casing without in any manner affecting the described advantages of the transformer winding and connection arrangements.

Although only a few embodiments of the invention have been illustrated, it will be clear to persons skilled in the art that various modifications may be made therein without departing from the spirit thereof or from the scope of the appended claims.

Having now particularly described and ascertained the nature of our said invention and in what manner the same is to be performed, we declare that what we claim is:

1. In a system of the character described, a transformer comprising a plurality of side-by-side arranged secondary windings each divided into a plurality of similarly arranged sections, the corresponding sections of the respective said windings being subject to parallel operation, and a plurality of parallel connected primary windings each coordinated to a separate one of said secondary windings by being arranged opposite the sections thereof to thereby substantially compensate the ampere turns of parallel operating ones of said sections and thus substantially equalize the voltage drop thereof.

2. In a system of the character described, a plurality of electric current rectifier anodes, a transformer comprising a plurality of side-by-side arranged secondary windings each divided into a plurality of sections severally connected with said anodes, the anodes connected with corresponding sections of the respective windings being subject to parallel operation, and a plurality of parallel connected primary windings equal in number to said secondary windings and each coordinated to a separate one of said secondary windings by being arranged opposite to each said section thereof to thereby compensate the ampere turns of the respective said windings and thus substantially equalize the voltage drop of the respective sections connected with parallel operating anodes.

3. In a system of the character described, a plurality of electric current rectifier anodes, a transformer comprising a plurality of side-by-side arranged secondary windings each divided into a plurality of sections severally connected with said anodes, and a plurality of parallel connected primary windings each coordinated to a separate one of said secondary windings by being arranged opposite to each said section thereof whereby the ampere turns of each said primary windings is compensated by the said sections coordinated thereto, the axial thrusts of said windings thereby prevented, and the voltage drop through the respective said sections substantially equalized.

4. In a system of the character described, electric current rectifying means comprising a cathode and a plurality of anodes, a transformer comprising a plurality of side-by-side arranged secondary windings each having a mid-point tap dividing the same into similarly arranged sections severally connected with said anodes and a plurality of parallel connected primary windings each comprising a main section coordinated to a separate one of said secondary windings by being arranged opposite each section thereof and a plurality of end sections arranged opposite to the sections of said secondary windings not coordinated thereto, and a circuit having included therein said cathode and the mid-point taps of said secondary windings, the anodes connected with corresponding sections of said secondary windings being subject to parallel operation.

5. In a system of the character described, electric current rectifying means comprising a cathode and a plurality of anodes, a transformer comprising a plurality of side-by-side arranged secondary windings each having a mid-point tap dividing the same into similarly arranged sections severally connected with said anodes and a plurality of parallel connected primary windings each comprising a main section and a plurality of end sections, the main sections of the said primary windings being severally coordinated to said secondary windings by being arranged opposite to the sections thereof and the end sections of adjacently arranged main sections being interlarded therebetween and connected in such manner that the turns thereof are of approximately equal potential, and a circuit having included therein said cathode and the mid-point taps of said secondary windings, the anodes connected with corresponding sections of said secondary windings being subject to parallel operation.

6. In a system of the character described, electric current rectifying means comprising a cathode and a plurality of anodes, a transformer comprising a plurality of side-by-side arranged secondary windings each having a mid-point tap dividing the same into similarly arranged sections severally connected with said anodes and a plurality of parallel connected primary windings each comprising a main section and a plurality of end sections, the main sections of said primary windings being severally coordinated to said secondary windings by being arranged opposite to the sections thereof and the end sections thereof being coupled with the sections of secondary windings not coordinated thereto, and a circuit having included therein said cathode and the mid-point taps of said secondary windings, the anodes connected with corresponding sections of said secondary windings being subject to parallel operation.

7. In a system of the character described, electric current rectifying means comprising a cathode and a plurality of anodes, a transformer comprising a plurality of side-by-side arranged secondary windings each having a mid-point tap dividing the same into similarly arranged sections severally connected with said anodes and a plurality of parallel connected primary windings severally coordinated to said secondary windings by being arranged opposite to the sections thereof, a circuit having included therein said cathode and the mid-point taps of said secondary windings, and means for equalizing the inductive voltage drop of the respective said secondary windings, the anodes connected with corresponding sections of said secondary windings being subject to parallel operation.

8. In a system of the character described, electric current rectifying means comprising a cathode and a plurality of anodes, a transformer comprising a plurality of side-by-side arranged secondary windings each having a mid-point tap dividing the same into similarly arranged sections severally connected with said anodes and a plurality of parallel connected primary windings severally coordinated to said secondary windings by being arranged opposite to the sections thereof, reactances included in the connections of certain of said anodes with the sections of said secondary windings whereby the inductive voltage drop of the respective said secondary windings is equalized, and a circuit having included therein said cathode and the mid-point taps of said secondary windings, the anodes connected with corresponding sections of said secondary windings being subject to parallel operation.

JOHANNES KUBLER.
JULIUS JONAS.